United States Patent [19]

Kosuda et al.

[11] 4,343,385
[45] Aug. 10, 1982

[54] AUTOMATIC DRIVE MECHANISM FOR VEHICLES

[75] Inventors: Toru Kosuda, Okazaki; Takeshi Matsui, Aichi, both of Japan

[73] Assignee: Nippon Soken, Inc., Nishio, Japan

[21] Appl. No.: 126,015

[22] Filed: Feb. 29, 1980

[30] Foreign Application Priority Data

Mar. 7, 1979 [JP] Japan .................................. 54-26290

[51] Int. Cl.³ ............................................ B60K 41/02
[52] U.S. Cl. ............................. 192/0.02 R; 192/0.096; 192/3.56
[58] Field of Search ...................... 192/0.02 R, 0.02 C, 192/0.033, 0.076, 3.56, 21.5, 84 C, 0.084, 0.096; 74/421 A

[56] References Cited

U.S. PATENT DOCUMENTS

| | | | |
|---|---|---|---|
| 2,172,126 | 9/1939 | Lansing | 102/0.02 R |
| 2,391,702 | 12/1945 | Hill | 74/421 A |
| 2,403,094 | 7/1946 | Lear | 192/0.02 R |
| 3,007,561 | 11/1961 | Harting | 192/84 C |
| 3,182,774 | 5/1965 | Basford | 192/0.02 R |
| 3,333,482 | 8/1967 | Wildhaber | 74/421 A |

FOREIGN PATENT DOCUMENTS

| | | | |
|---|---|---|---|
| 621886 | 4/1949 | United Kingdom | 74/421 A |
| 2041481 | 10/1980 | United Kingdom | 192/0.02 R |

*Primary Examiner*—George H. Krizmanich
*Attorney, Agent, or Firm*—Cushman, Darby & Cushman

[57] ABSTRACT

An automatic drive mehanism for controlling a travelling speed of a vehicle at a preset value by transmitting the rotational movement of the members on the input shaft side driven by an electric motor to the output shaft side through an electromagnetic clutch to rotate an output member disposed on the output shaft side through a desired angle.

The automatic drive mechanism comprises a stationary housing to be fixed to the vehicle, an electric motor, reduction gears, a coil cover driven by the reduction gears, an electromagnetic coil fixed to the housing and surrounded by the coil cover, a magnetic core member joined to the coil cover and rotating at a central portion of the electromagnetic coil, a clutch plate facing the coil cover, a friction engagement member intervening between the clutch plate and the coil cover, an output shaft joined to the clutch plate and supported rotatably and shiftably in the direction of its axis by the housing, an output member joined to the output shaft and associated with an accelerator mechanism of the vehicle, feed means arranged to extend through a first angular slot provided in the clutch plate and energizing the electromagnetic coil, and fixing members extending through a second angular slot provided in the clutch plate and fixing the electromagnetic coil to the housing.

3 Claims, 2 Drawing Figures

AUTOMATIC DRIVE MECHANISM FOR VEHICLES

BACKGROUND OF THE INVENTION

1. Field of the Invention

This invention relates to an automatic drive mechanism for controlling a travelling speed of a vehicle at a preset value, and relates more specifically to an electromagnetic clutch mechanism used therein.

2. DESCRIPTION OF THE PRIOR ART

There have heretofore been proposed various types of automatic drive mechanisms for vehicles. In one type of the automatic drive mechanisms proposed in the past, each of which uses an electromagnetic clutch, a cylindrical coil bobbin is fixed to a portion of electromagnetic yokes on the side of an input shaft which yokes are constituted by two portions and surround the coil bobbin. The coil bobbin is incorporated with the input shaft to be rotated with the latter. The energization of an electromagnetic coil on the coil bobbin is performed by the use of slip-ring type contacts comprising slip rings and brushes, and a frictionally engaging portion comprising pins and pin reception holes is disposed at the circumferential portions on the opposing surfaces of the input shaft side yoke portion and the output shaft side yoke portion, whereby, when the electromagnetic coil is energized, the input and output shafts engage each other through the pins and pin reception holes thereby to drive a throttle link of an engine by the output shaft.

In this type of automatic drive mechanism the coil bobbin is incorporated with the input shaft and rotates together with the latter, so that it becomes necessary to have slip-ring type contacts arranged along an entire circumference of the rotational portion. Additionally, the slip-ring type contacts must be kept electrically insulated from the other portions of the automatic drive mechanism. Furthermore, such a type of automatic drive mechanism has disadvantages such that the slip-ring type contacts may give rise to a failure in the operation of the automatic drive mechanism because of a contact failure occurring at the slip-ring type contacts and also that the construction of the automatic drive mechanism becomes complicated because the slip-ring type contacts have to be insulated electrically from the other portions of the automatic drive mechanism and arranged along an entire circumference.

SUMMARY OF THE INVENTION

With a view to eliminating the above-mentioned drawbacks, this invention aims to provide an improved automatic drive mechanism by fixing a cylindrical coil bobbin to a stationary housing, arranging electromagnetic yokes, which are constituted by two portions, in such a way as to surround the coil bobbin, and disposing input and output shafts at the central portions of the two yoke portions, respectively, so that slip-ring type contacts for energizing an electromagnetic coil wound on the coil bobbin may be omitted and the electromagnetic coil may be energized directly through lead wires, etc., thereby obviating any problem which might be caused by a contact failure and providing a simple construction.

DESCRIPTION OF THE PREFERRED EMBODIMENTS

Figure 1:
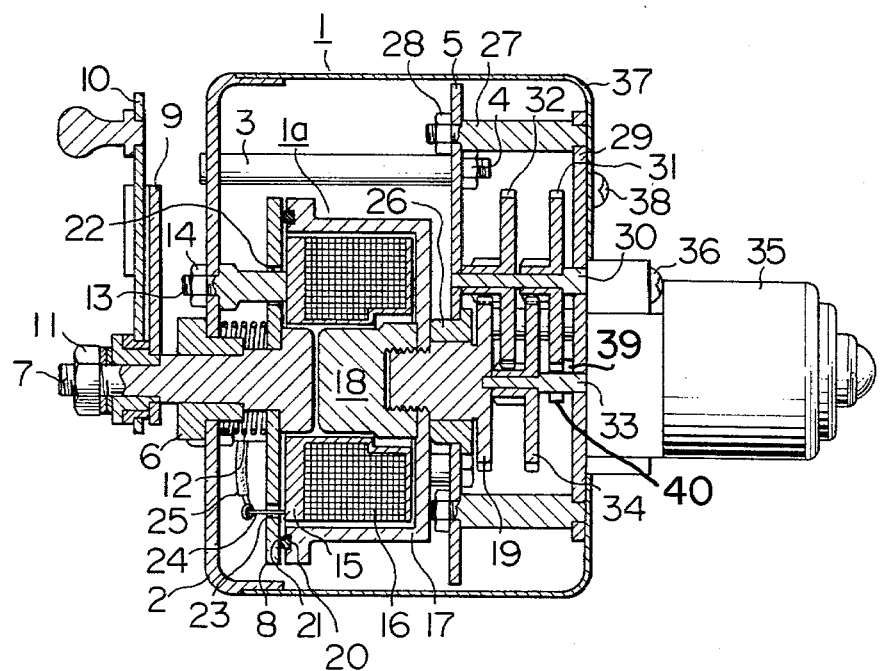
FIG. 1 is a structural drawing of a local section showing an example of the automatic drive mechanism embodying this invention.

An explanation will be given hereinafter of the embodiments of this invention shown in the accompanying drawings. In FIG. 1, numeral 1 designates the whole assembly of an automatic drive mechanism embodying this invention, and 1a an electromagnetic clutch assembly. A housing 2 in the automatic drive mechanism 1 is fixed to an engine or a vehicle body not shown. There is fixed to the housing 2 with bolts 3 and nuts 4 a center plate 5 which forms a portion of the housing 2. A bearing 6 is fixed to the housing 2, and the bearing 6 slidably supports an output shaft 7 to which is fixed a clutch plate 8 forming a portion of electromagnetic yoke portions.

An arm stopper 9 is fixed to the output shaft 7 to be driven by the latter. An arm 10 is rotatably mounted on the output shaft 7 by being retained thereon with a nut 11. A spring 12 is arranged to exert a turning force on the output shaft 7 in the direction such that the arm stopper 9 always urges the arm 10. A cylindrical coil bobbin 15 having an electromagnetic coil 16 wound thereon is fixed to the housing 2 with fixing members of a bolt 13 and a nut 14. A coil cover 17 forms the other portion of the electromagnetic yoke portions to surround the cylindrical coil bobbin 15, and the coil cover 17 is fixed with a nut 18 to a fourth reduction gear 19 which operates as an input shaft. The nut 18 acts as a magnetic core of the electromagnetic coil 16.

A ring-shaped friction engagement member 21 made of a material including rubber, etc. is arranged between the opposing surfaces of the clutch plate 8 and the coil cover 17 by being fixed in a slot 20 provided in the opposing surface of the coil cover 17. The bolt 13 for fixing the coil bobbin 15 to the housing 2 extends through an angular slot 22 provided in the clutch plate 8. The angular slot 22 has a shape of a circular arc with a fixed radius so as to prevent the clutch plate 8 from contacting the bolt 13 within the range of the operating angle of rotation of the clutch plate 8. A terminal 24 connected to feed wiring to energize the coil 16 is fixed to the coil bobbin 15 and also extends through an angular slot 23 provided in the clutch plate 8. The angular slot 23 is shaped to prevent its contact with the terminal 24 within the range of the operating angle of rotation of the clutch plate 8. The terminal 24 is electrically insulated from the other portions of the automatic drive mechanism 1 and has a lead wire 25 soldered thereto. The center plate 5 has a bearing 26 fixed thereto, and the bearing 26 supports the fourth reduction gear 19 inserted therein.

A cover plate 29 is fixed to the center plate with bolts 27 and nuts 28. To the cover plate 29 are fixed a gear shaft 30, which supports a first reduction gear 31 and a third reduction gear 32, and also a gear shaft 33 which supports a second reduction gear 34. An electric motor 35 is fixed to the cover plate 29 with screws 36. The electric motor 35 has an input gear 40 fixed onto its output shaft 39, which input gear 40 engages the first reduction gear 31. The cover 37 is fixed to the cover plate 29 with screws 38.

An explanation will be given hereunder of the operation of the automatic drive mechanism of the above-described structure. In the case where the automatic drive mechanism 1 is not made use of, the arm 10 is moved in response to the operation of an accelerator link (not shown). Since the output shaft 7 receives a turning force by the spring 12 in the direction such that the arm stopper 9 always urges the arm 10, all of the arm stopper 9, the output shaft 7 and the clutch plate 8 move together with the arm 10. The turning force by the spring 12 is made smaller than the opposite turning force of the arm 10 caused by the return force of the accelerator link with which the arm 10 is linked. Accordingly, when the accelerator link is not operated, the return force of the accelerator link causes the arm 10 to remain at its initial position, which corresponds to the home position of the accelerator (not shown) of the vehicle, namely, the closed position of a throttle valve in the accelerator. Now, let us suppose that the automatic drive mechanism 1 is put into operation at a certain vehicle speed. At this time, when the electric motor 35 has not been energized if the terminal 24 is fed through the lead wire 25 to energize the electromagnetic coil 16, a magnetic circuit formed by the coil cover 17, the fourth reduction gear 19, the nut 18, the output shaft 7 and the clutch plate 8 causes the input shaft side magnetic core comprising the coil cover 17 and the nut 18 and the output shaft side magnetic core comprising the output shaft 7 and the clutch plate 8 to attract each other. As a result, the output shaft 7 and the clutch plate 8 shift toward the nut 18 and the coil cover 17 and the friction engagement member 21 arranged between the opposing surfaces of the clutch plate 8 and the coil cover 17 is compressed to cause the clutch plate 8 and the coil cover 17 to be coupled together in the mutually attracted state, thereby causing the arm stopper 9 to urge the arm 10 and thus maintaining the degree of opening of the throttle valve (not shown) of the engine at a desired amount.

Then, let us suppose that the vehicle speed has departed from a preset value. Then, an automatic vehicle speed regulating apparatus (not shown) energizes the electric motor 35 and causes it to rotate the input gear 40 disposed on the output shaft 39 of the electric motor 35. Then, the rotation of the electric motor 35 is reduced through the first reduction gear 31, second reduction gear 34, third reduction gear 32 and fourth reduction gear 19 and transmitted to the input shaft incorporated with the fourth reduction gear 19. Since the input shaft and the output shaft 7 have already been coupled together, the reduced rotation of the electric motor 35 is transmitted to the output shaft 7. Thus, the arm stopper 9 is rotated to move the arm 10, which in turn moves the accelerator link to regulate the degree of opening of the throttle valve, thereby controlling the vehicle speed at the preset value. As described above, though the coil bobbin 15 is fixed to the housing 2 with the bolt 13 and does not rotate together with the input shaft, the clutch plate 8 is allowed to rotate through a required operating angle of rotation (covering the full operating range of the throttle valve from its fully closed position to fully opened position) due to the provision of the angular slot 22 in the clutch plate 8. In the same way, the clutch plate 8 can avoid its contact with the terminal 24 of the electromagnetic coil 16 within the range of the required operating angle of rotation due to the provision of the angular slot 23 in the clutch plate 8.

Since the friction engagement member 21 is formed of a friction material such as rubber or the like and does not make use of the engagement structure such as pins and pin holes, when the electromagnetic coil 16 is energized, the input and output shafts are coupled together immediately through the friction engagement member 21 in the mutually attracted state thereby to rotate together as one body. Therefore, it is possible to control the vehicle speed accurately and smoothly with no fluctuations in the vehicle speed from the start of the operation of the automatic drive mechanism.

Figure 2:
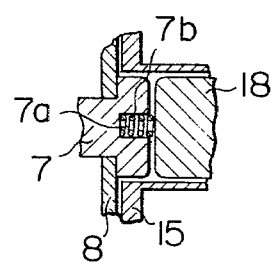
FIG. 2 is a sectional drawing showing another embodiment of this invention which comprises a return spring intervening between the central portions of the output shaft and the nut on the input side.

Next, as shown in FIG. 2 which illustrates another embodiment of this invention, the output shaft 7 may be provided with a blind hole 7a in its right side end face to have a spring 7b inserted therein. With this construction, as soon as the electromagnetic coil 16 is de-energized, the extension force of the spring 7b enables the arm 10 and the output shaft 7 to rotate freely with respect to the coil cover 17 on the input side so that they may be allowed to move smoothly in response to the movement of the accelerator not shown.

In the construction of the embodiments of this invention, as described in the foregoing, the cylindrical coil bobbin is fixed to the housing and the movable divided electromagnetic yoke portions are arranged to surround the electromagnetic coil wound on the cylindrical coil bobbin. Therefore, it is possible to energize the electromagnetic coil directly through the feed wiring without using any slip-ring type contacts, which brings remarkable advantages of the prevention of the occurrence of contact failures and the simplification of the structure of an automatic drive mechanism.

We claim:

1. An automatic drive mechanism for an automotive vehicle for positioning an output shaft, comprising:
   a housing;
   an electric motor, having an output shaft, fixed to said housing;
   a reduction gear mechanism, having an input and an output gear, arranged inside said housing, said input gear being engaged with said output shaft of said electric motor;
   a coil cover fixed to said output gear of said reduction gear mechanism;
   an electromagnetic coil surrounded by said coil cover;
   a magnetic core member arranged in a central space of said electromagnetic coil and fixed to said coil cover;
   an output shaft supported rotatably and shiftably in a direction of its axis by said housing;
   a clutch plate fixed to said output shaft and being arranged to face said coil cover, said clutch plate having a first and a second angular slot;
   a friction engagement member intervening between said clutch plate and said coil cover, and fixed to one of said coil cover and clutch plate;
   feed means arranged to extend through said first angular slot and electrically connected to said electromagnetic coil for energizing the same; and
   fixing members extending through said second angular slot for fixing said electromagnetic coil to said housing,
   whereby, when said electromagnetic coil is energized, said clutch plate is coupled to said coil cover so that limited rotation of said electric motor is transmitted through said reduction gear mechanism, said coil cover and said clutch plate to said output shaft.

2. An automatic drive mechanism according to claim 1, wherein said friction engagement member is made of a rubber material.

3. An automatic drive mechanism according to claim 1 or 2, further comprising a spring member intervening between said magnetic core member and said output shaft facing said magnetic core member to be always in engagement with both thereof, and exerting a repelling force against the end of said output shaft.

* * * * *